US012569815B2

(12) United States Patent
Kim et al.

(10) Patent No.: US 12,569,815 B2
(45) Date of Patent: Mar. 10, 2026

(54) NANOMEMBRANE AND FORMING METHOD THEREOF

(71) Applicants: SEOUL NATIONAL UNIVERSITY R&DB FOUNDATION, Seoul (KR); INSTITUTE FOR BASIC SCIENCE, Daejeon (KR)

(72) Inventors: Dae-Hyeong Kim, Seoul (KR); Taeghwan Hyeon, Seoul (KR); Dongjun Jung, Seoul (KR); Chaehong Lim, Seoul (KR); Hyung Joon Shim, Seoul (KR)

(73) Assignees: SEOUL NATIONAL UNIVERSITY R&DB FOUNDATION, Seoul (KR); INSTITUTE FOR BASIC SCIENCE, Daejeon (KR)

( * ) Notice: Subject to any disclaimer, the term of this patent is extended or adjusted under 35 U.S.C. 154(b) by 825 days.

(21) Appl. No.: 17/751,503

(22) Filed: May 23, 2022

(65) Prior Publication Data

US 2022/0387939 A1 Dec. 8, 2022

(30) Foreign Application Priority Data

Jun. 3, 2021 (KR) ........................ 10-2021-0072433

(51) Int. Cl.
| | |
|---|---|
| *B01D 69/12* | (2006.01) |
| *B01D 71/02* | (2006.01) |
| *B01D 71/62* | (2006.01) |
| *B82Y 40/00* | (2011.01) |
| *H01B 1/12* | (2006.01) |

(Continued)

(52) U.S. Cl.
CPC .......... *B01D 69/12* (2013.01); *B01D 71/022* (2013.01); *B01D 71/62* (2013.01); *B82Y 40/00* (2013.01); *H01B 1/124* (2013.01); *H01B 5/14* (2013.01); *H01B 13/0013* (2013.01); *H01B 13/0026* (2013.01); *B01D 2325/02* (2013.01)

(58) Field of Classification Search
None
See application file for complete search history.

(56) References Cited

U.S. PATENT DOCUMENTS

2018/0186955 A1* 7/2018 Odeh ....................... B01J 21/08

FOREIGN PATENT DOCUMENTS

| | | | | |
|---|---|---|---|---|
| WO | WO-2014165908 A1 * | 10/2014 | ......... | A61B 5/02116 |
| WO | WO-2022084309 A1 * | 4/2022 | ............. | G02B 1/002 |

* cited by examiner

*Primary Examiner* — Ramsey Zacharia

(57) ABSTRACT

A nanomembrane and a forming method thereof are provided. The nanomembrane according to embodiments of the present invention comprises an elastomer layer and nanostructures disposed on the elastomer layer. The method for forming a nanomembrane according to embodiments of the present invention comprises forming a nanocomposite solution comprising nanostructures and an elastomer solution, forming an elastomer solution layer by providing the nanocomposite solution on a first solvent, and forming an elastomer layer by drying the elastomer solution layer, and forming a nanomembrane comprising the elastomer layer and the nanostructures bonded to the elastomer layer. The nanocomposite solution is formed by mixing the nanostructures and the elastomer solution with a second solvent, and the elastomer solution is formed by mixing elastomer and a third solvent.

12 Claims, 26 Drawing Sheets
(26 of 26 Drawing Sheet(s) Filed in Color)

(51) Int. Cl.
    *H01B 5/14*           (2006.01)
    *H01B 13/00*         (2006.01)

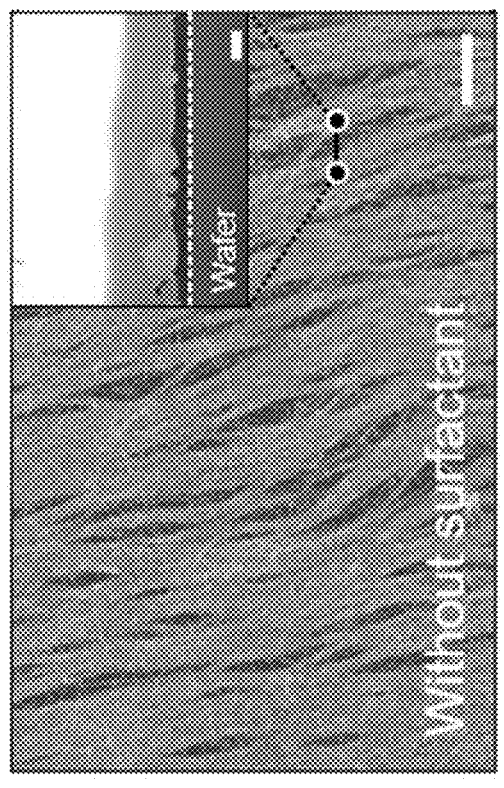
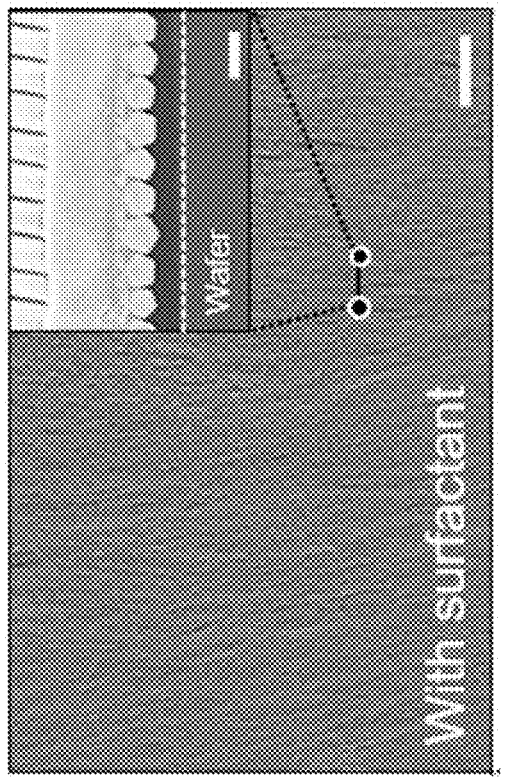
Fig. 8

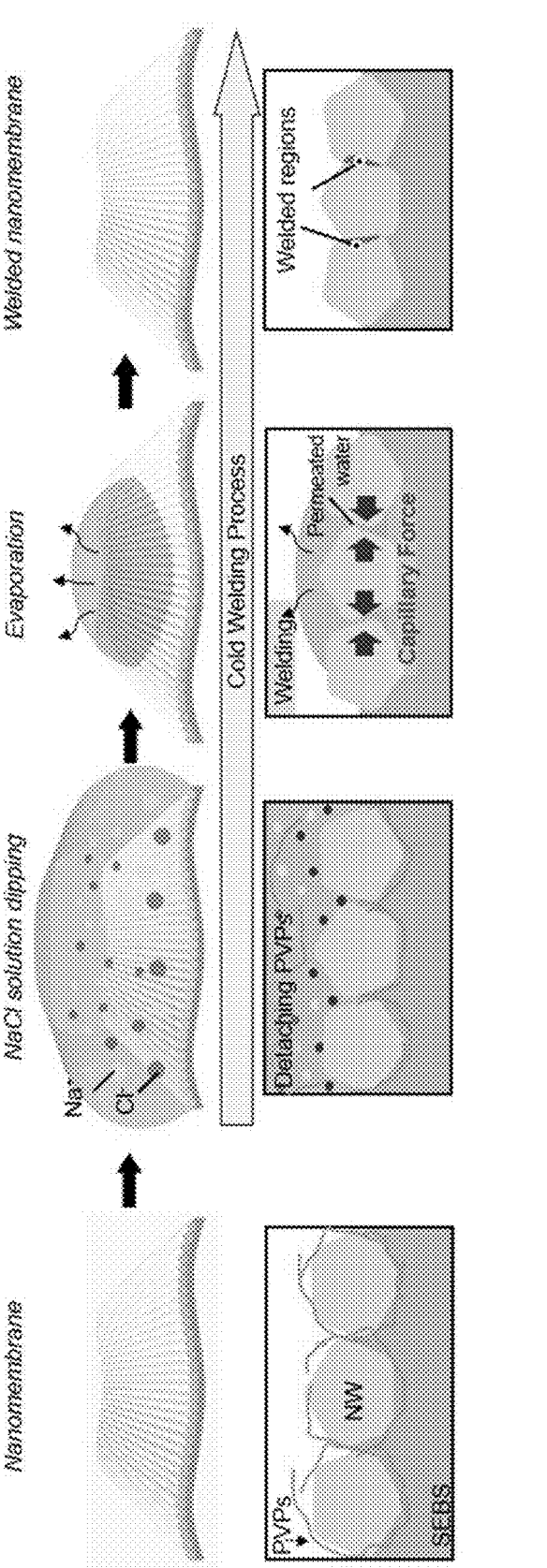
F i g . 1 7

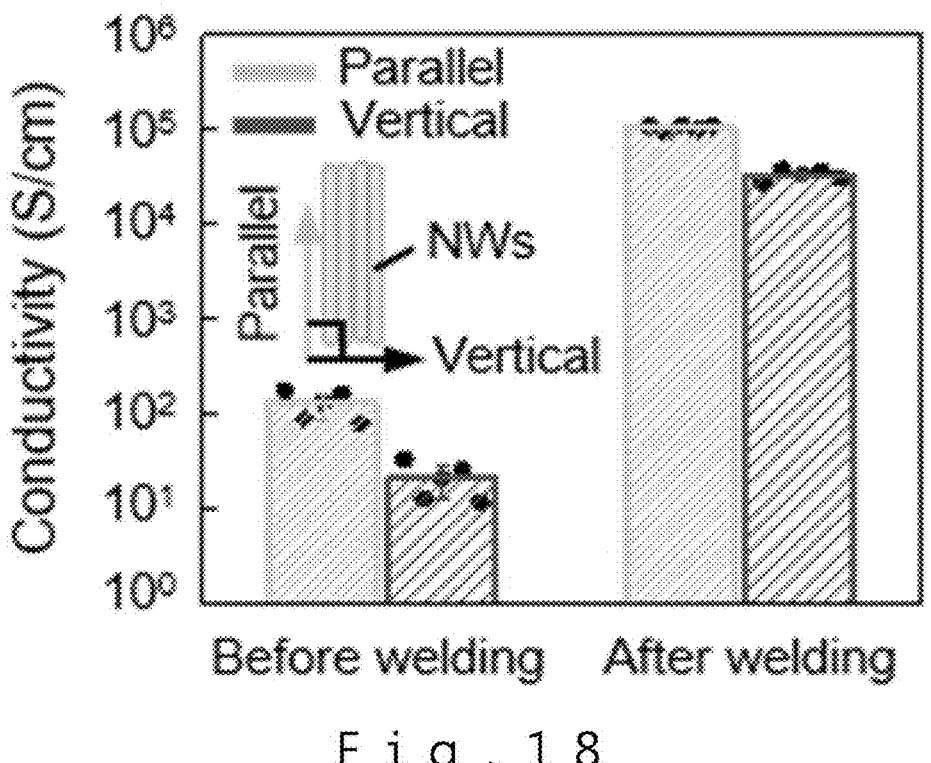
F i g . 1 8
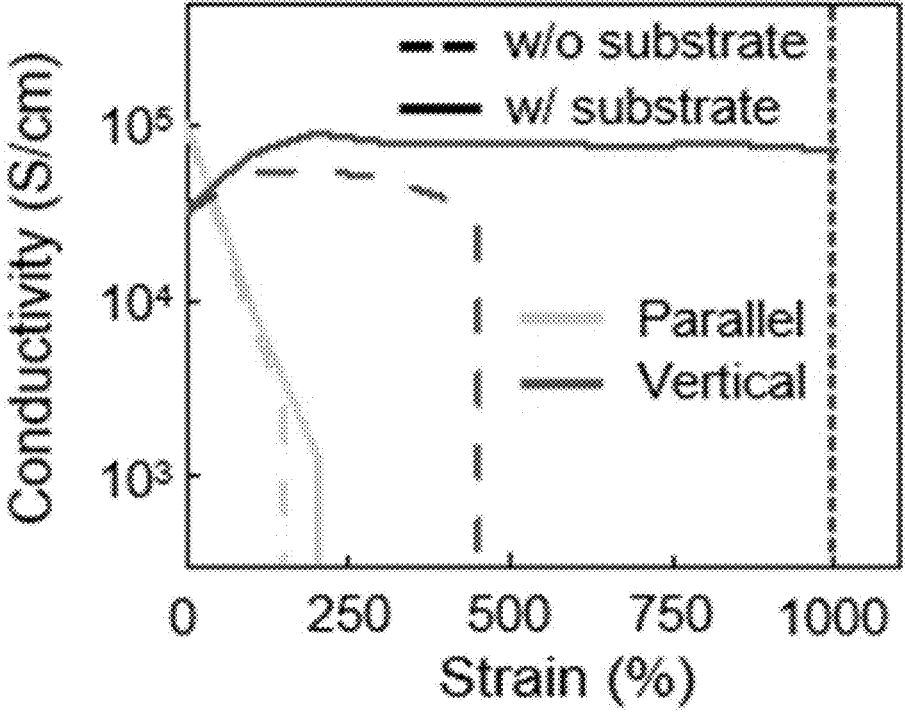
F i g . 1 9

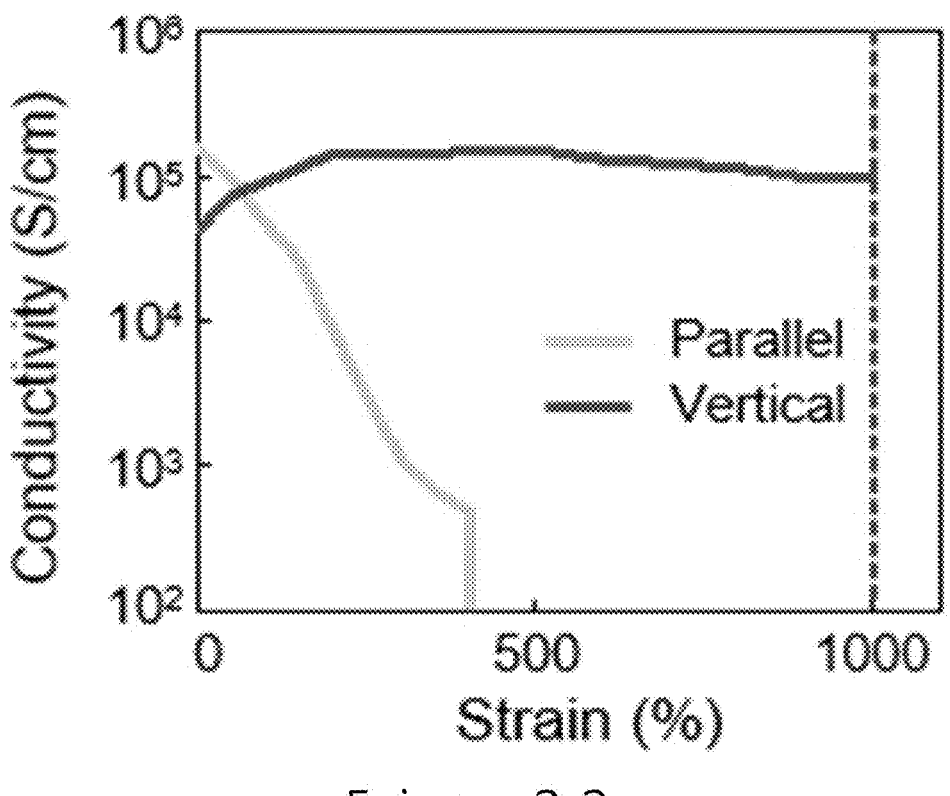
F i g . 2 2
Perpendicular stacking          P-stacked Nanomembrane
F i g . 2 3

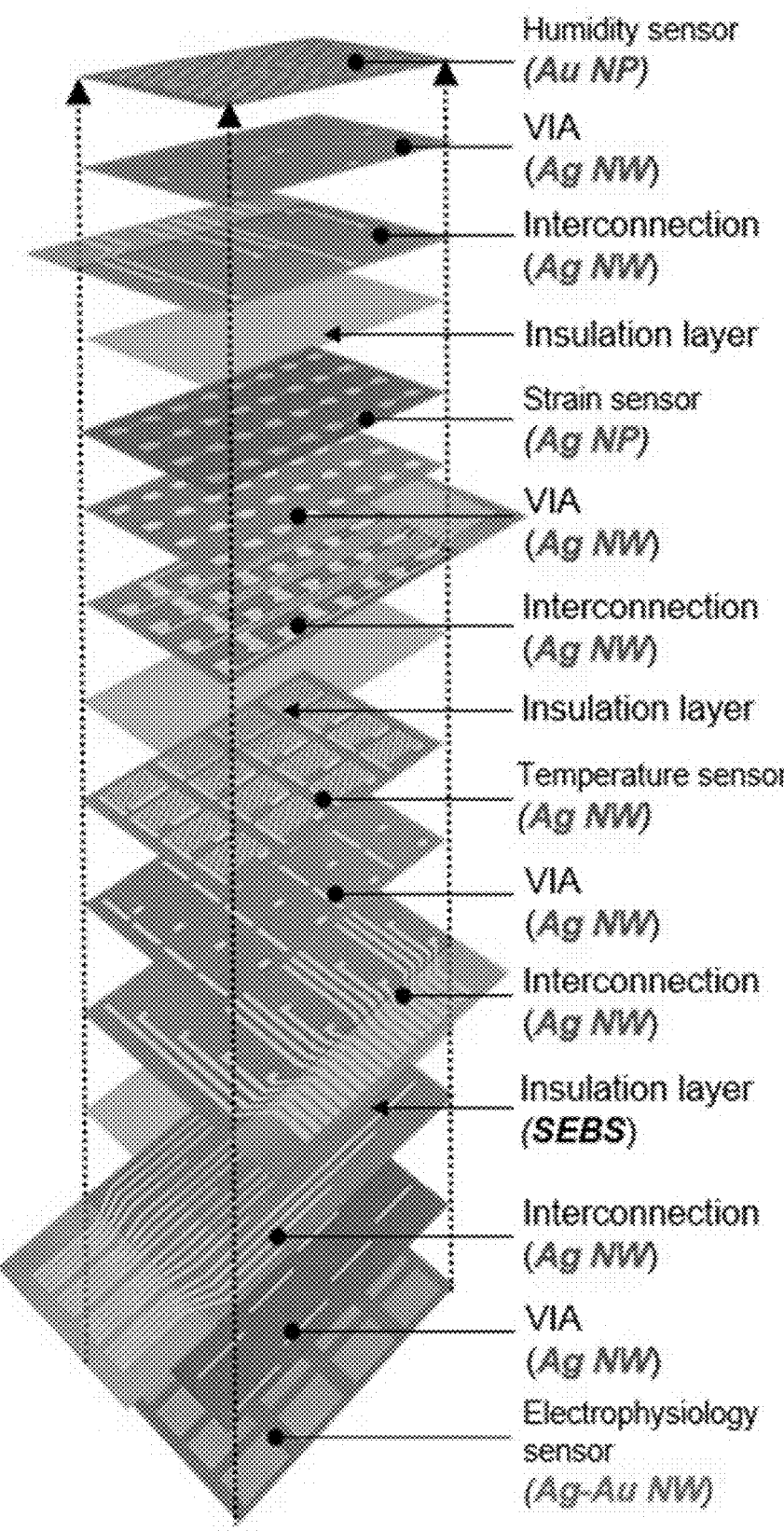
F i g . 2 8

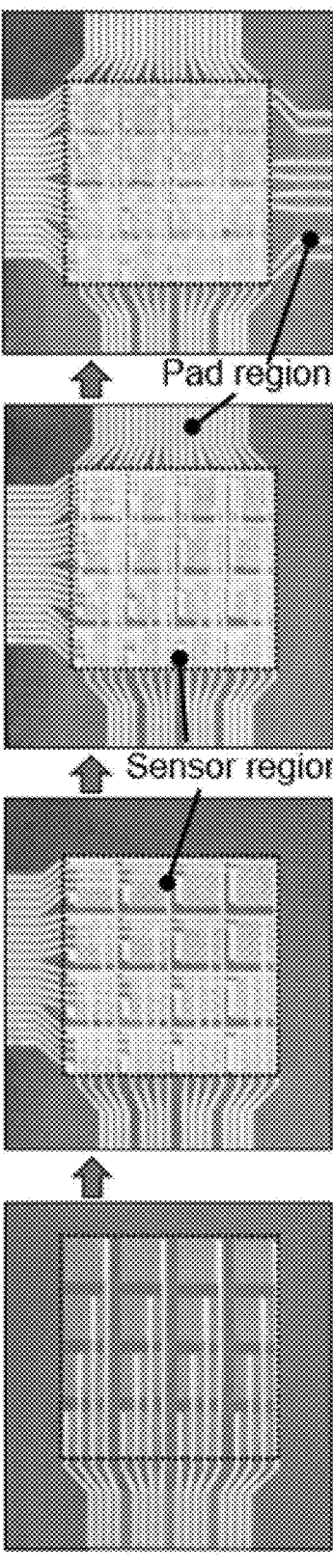
F i g . 2 9

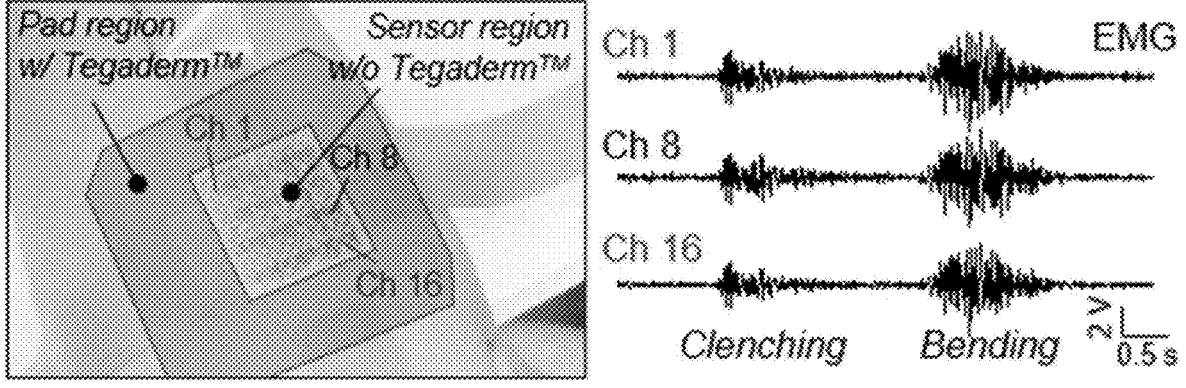
F i g . 3 0
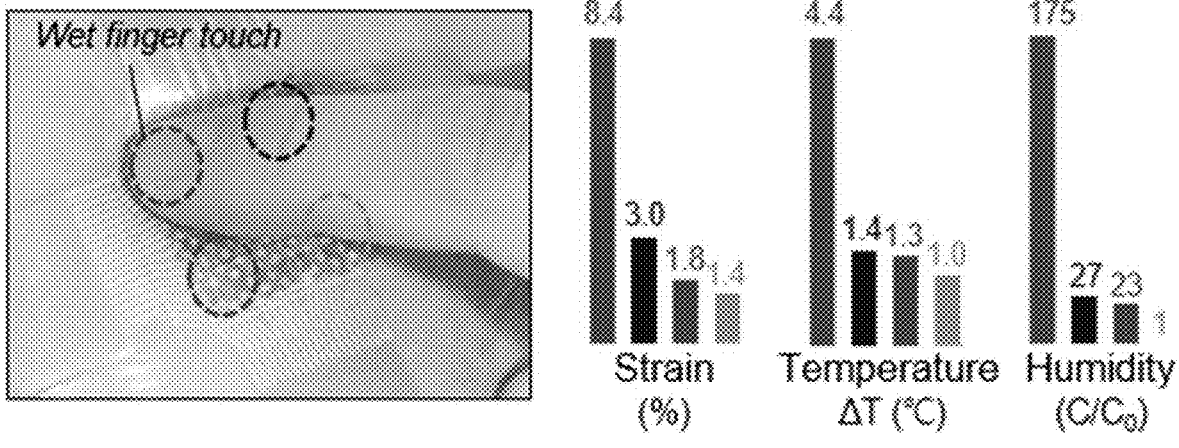
F i g . 3 1

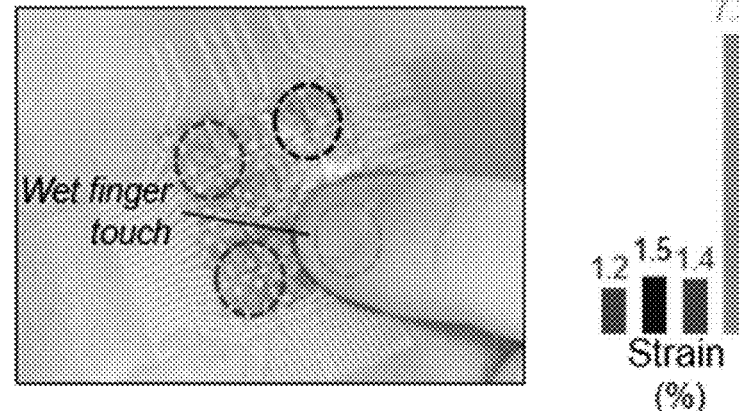
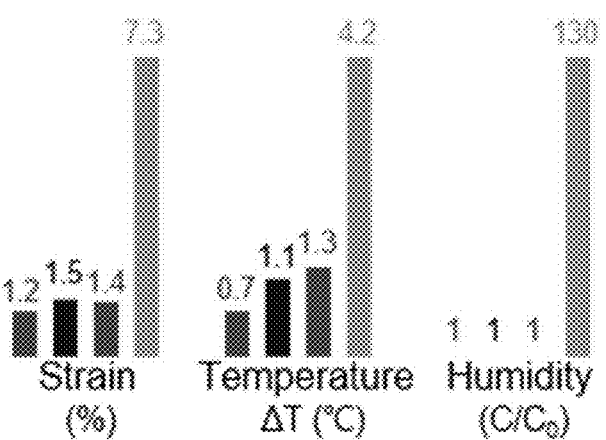
F i g . 3 2

NANOMEMBRANE AND FORMING METHOD THEREOF

BACKGROUND OF THE INVENTION

1. Field of the Invention

The present invention relates to a nanomembrane and a forming method thereof.

2. Description of the Related Art

Recently, a technology for attaching an electronic device to a person's skin and using it in various ways has been studied. Since the skin electronic device is formed by stacking sensors and peripheral devices for measuring various signals such as EMG, temperature, humidity, etc., the thickness thereof is thick, which may cause inconvenience such as difficulty in attaching to the skin or a feeling of heterogeneity in the user. When the thickness of the electronic device is reduced, there is a problem in that performance such as elasticity or conductivity is deteriorated.

SUMMARY OF THE INVENTION

The present invention provides a nanomembrane having good performance.

The present invention provides a method for forming the nanomembrane.

The other objects of the present invention will be clearly understood with reference to the following detailed description and the accompanying drawings.

A nanomembrane according to embodiments of the present invention comprises an elastomer layer and nanostructures disposed on the elastomer layer.

The nanostructures may be partially embedded in the elastomer layer. The nanostructures may comprise at least one of nanowires and nanoparticles. The nanostructures may be disposed as a single layer on the elastomer layer. The nanostructures may be connected to each other. The nanostructures may have conductivity.

The nanomembrane may be formed by the method comprising forming a nanocomposite solution comprising nanostructures and an elastomer solution, providing the nanocomposite solution on a first solvent to form an elastomer solution layer, and drying the elastomer solution layer to form an elastomer layer and form a nanomembrane comprising the elastomer layer and the nanostructures bonded to the elastomer layer. The nanocomposite solution is formed by mixing the nanostructures and the elastomer solution with a second solvent, and the elastomer solution is formed by mixing elastomer and a third solvent.

A nanomembrane according to embodiments of the present invention comprises a first elastomer layer, first nanostructures disposed on the first elastomer layer, second nanostructures dipsoed on the first nanostructures, and a second elastomer layer disposed on the second nanostructures.

A method for forming a nanomembrane according to embodiments of the present invention comprises forming a nanocomposite solution comprising nanostructures and an elastomer solution, providing the nanocomposite solution on a first solvent to form an elastomer solution layer, and drying the elastomer solution layer to form an elastomer layer and form a nanomembrane comprising the elastomer layer and the nanostructures bonded to the elastomer layer. The nanocomposite solution is formed by mixing the nanostructures and the elastomer solution with a second solvent, and the elastomer solution is formed by mixing elastomer and a third solvent.

The nanostructures may be partially embedded in the elastomer layer. The nanostructures may be bonded to the elastomer layer as a single layer. The nanostructures may comprise at least one of nanowires and nanoparticles.

Forming the elastomer solution layer may comprise packing the elastomer solution layer on the first solvent. The elastomer solution layer may be packed by providing a surfactant to the central portion of the elastomer solution layer. The nanostructures may be dispersed and disposed at the interface between the elastomer solution layer and the first solvent and then packed when the elastomer solution layer is packed.

The method may further comprise performing cold welding on the nanomembrane. The cold welding may be performed by providing a sodium chloride solution to the nanomembrane. The nanostructures may have an amphiphilic ligand, and the amphiphilic ligand may be removed by the cold welding to strengthen the connection between the nanostructures.

The method may further comprise patterning the nanostructures by performing a photolithography process on the nanomebrane.

The first solvent and the second solvent may be water-miscible solvents, and the third solvent may be a water-immiscilbe solvent.

The nanomembrane according to embodiments of the present invention has good performance. For example, the nanomembrane may be ultra-thin and have good elasticity and conductivity. By using the nanomembrane, it is possible to implement a multifunctional electronic device with good performance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will be more clearly understood from the following detailed description taken in conjunction with the accompanying drawings, in which:

FIG. 8 is a view for explaining the effect of a surfactant on the density of nanowires to be assembled.

FIG. 17 shows a cold welding process performed on the nanomembrane.

FIG. 18 shows the change in the conductivity of the nanomembrane before and after cold welding.

FIG. 19 shows the conductivity of the nanomembrane under applied strain.

FIGS. 21 and 22 show the conductivity of the aligned stacked nanomembrane of FIG. 20.

FIG. 23 shows a perpendicularly-stacked nanomembrane formed by stacking the two nanomembrane so that the nanowires in the two nanomembrane are intersected and overlapped with each other in the vertical direction.

FIG. 28 is an exploded view of a sensor array of a multifunctional skin-mounted sensing device comprising a nanomembrane.

FIG. 29 is an optical camera image showing a sequential stack of each sensor array of FIG. 28.

FIG. 30 shows an optical camera image of a skin-mounted sensing device and electromyography (EMG) data recorded in three channels.

FIGS. 31 and 32 show signal changes of strain, temperature, and humidity measured by a sensor of a sensing device touched with a wet finger.

DESCRIPTION OF SPECIFIC EMBODIMENTS

Figure 1:
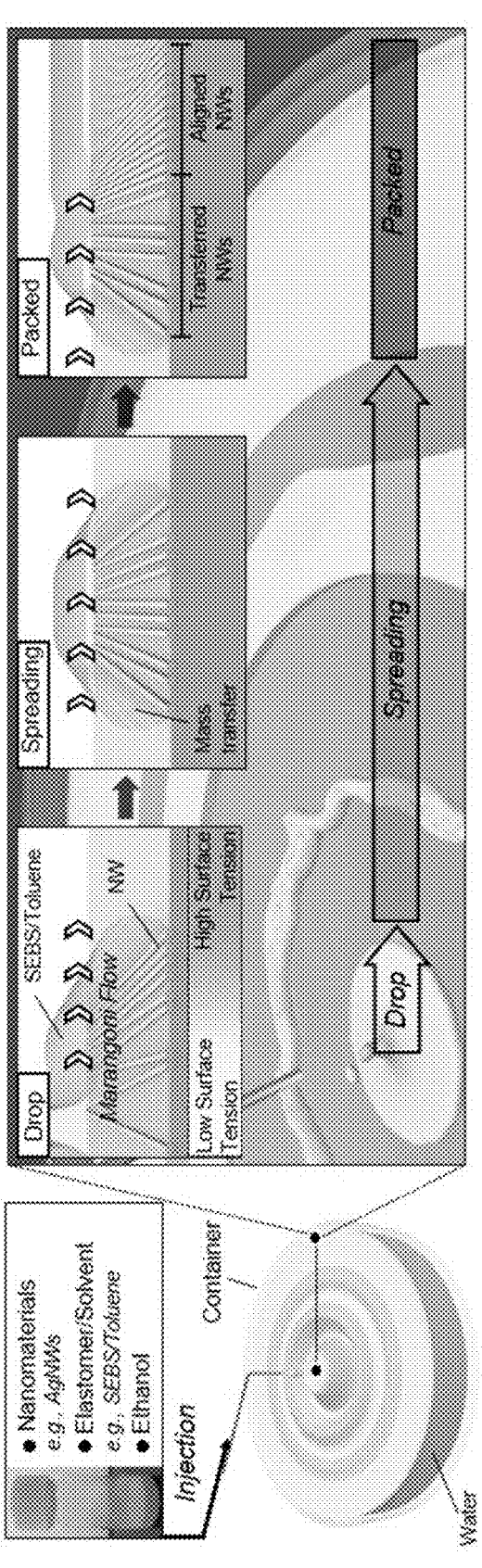
FIGS. 1 and 2 are views for explaining a method of forming a nanomembrane according to an embodiment of the present invention.

Hereinafter, a detailed description will be given of the present invention with reference to the following embodiments. The purposes, features, and advantages of the present invention will be easily understood through the following embodiments. The present invention is not limited to such embodiments, but may be modified in other forms. The embodiments to be described below are nothing but the ones provided to bring the disclosure of the present invention to perfection and assist those skilled in the art to completely understand the present invention. Therefore, the following embodiments are not to be construed as limiting the present invention.

Terms like 'first', 'second', etc., may be used to indicate various components, but the components should not be restricted by the terms. These terms are only used to distinguish one element, component, region, layer or section from another region, layer or section. A first element, component, region, layer or section could be termed a second element, component, region, layer or section without departing from the teaching of the embodiments of the present invention. It will be understood that when an element is referred to as being "on" another element, it can be directly on the other element or intervening elements may be present therebetween.

The size of the element or the relative sizes between elements in the drawings may be shown to be exaggerated for more clear understanding of the present invention. In addition, the shape of the elements shown in the drawings may be somewhat changed by variation of the manufacturing process or the like. Accordingly, the embodiments disclosed herein are not to be limited to the shapes shown in the drawings unless otherwise stated, and it is to be understood to include a certain amount of variation.

The terminology used herein is for the purpose of describing particular embodiments only and is not intended to limit the invention. It is to be understood that the singular forms "a," "an," and "the" include plural references unless the context clearly dictates otherwise. It will be further understood that the terms "comprises" or "has," when used in this specification, specify the presence of stated features, integers, steps, operations, elements, and/or components, but do not preclude the presence or addition of one or more other features, integers, steps, operations, elements, components, and/or groups thereof.

Figure 2:
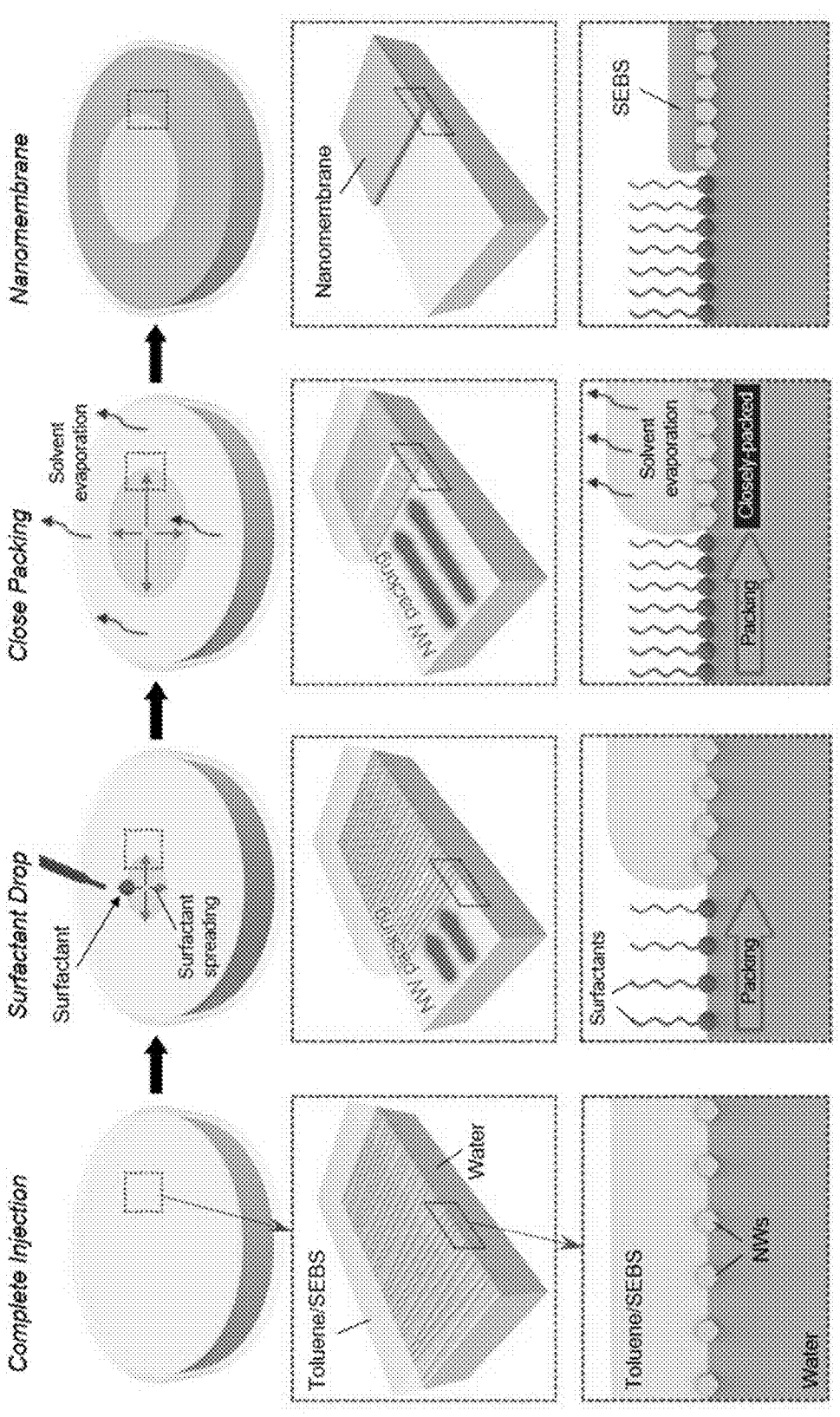

FIGS. 1 and 2 are views for explaining a method of forming a nanomembrane according to an embodiment of the present invention.

Referring to FIGS. 1 and 2, the method for forming the nanomembrane comprises forming a nanocomposite solution comprising nanostructures and an elastomer solution, providing the nanocomposite solution on a first solvent to form an elastomer solution layer, packing the elastomer solution layer on the first solvent, and drying the elastomer solution layer to form an elastomer layer and form a nanomembrane comprising the elastomer layer and the nanostructures bonded to the elastomer layer.

1) The nanocomposite solution comprising the nanostructures and the elastomer solution is formed. The nanocomposite solution may be formed by mixing the nanostructures and the elastomer solution with a second solvent.

The nanostructures may comprise at least one of nanowires and nanoparticles. The nanostructures may comprise, for example, silver nanowires (Ag NW), silver-gold (core-shell) nanowires (Ag—Au NW), silver nanoparticles (Ag NP), gold nanoparticles (Au NP), etc. In this embodiment, silver nanowires are described as the nanostructures as an example. The nanostructures may have an amphiphilic ligand. The amphiphilic ligand may comprise, for example, polyvinylpyrrolidone (PVP), etc.

The elastomer solution may comprise elastomer and a third solvent. The elastomer is dissolved in the third solvent. The elastomer may comprise, for example, poly(styrene-ethylene-butylene-styrene) (SEBS), thermoplastic polyurethane (TPU), poly(styrene-isoprene-styrene) (SIS), etc. The third solvent may be a water-immiscible solvent. The third solvent may comprise, for example, toluene, hexane, diethyl ether, ethyl acetate, etc. In this embodiment, poly(styrene-ethylene-butylene-styrene) (SEBS) is used as the elastomer and toluene is used as the third solvent.

The second solvent may be a water-miscible solvent. The second solvent may comprise, for example, water, ethanol, methanol, ethylene glycol, glycerol, etc. In this embodiment, ethanol is used as the second solvent. The nanocomposite solution preferably comprises the second solvent, but is not limited thereto and does not necessarily comprise it.

2) The nanocomposite solution is provided on the first solvent to form the elastomer solution layer.

When the nanocomposite solution comes into contact with the first solvent, the solvents in the solution are immediately separated. The first solvent may be a water-miscible solvent. The first solvent may comprise, for example, water, ethanol, methanol, ethylene glycol, glycerol, etc. In this embodiment, water (deionized water) is used as the first solvent.

Figure 3:
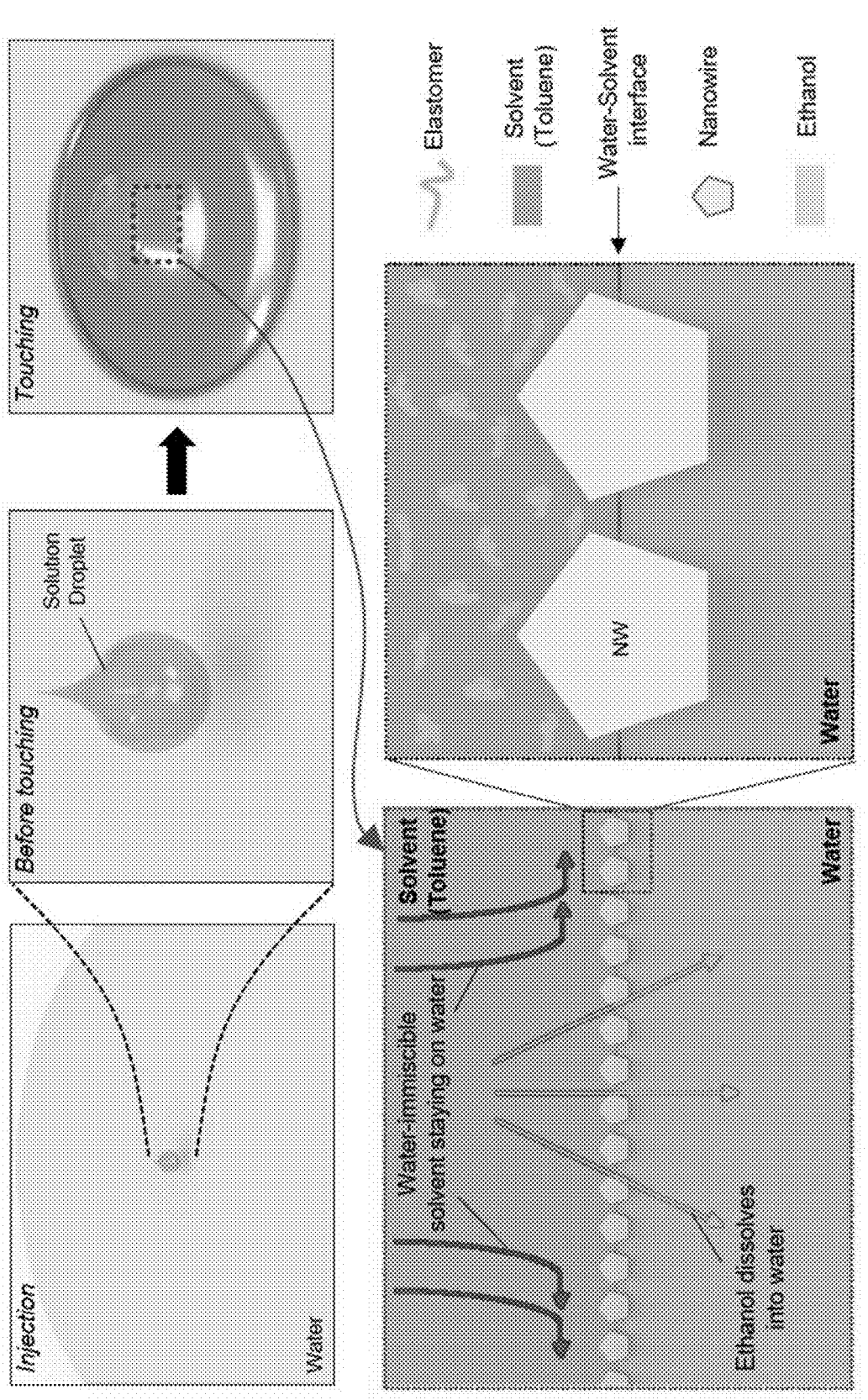
FIG. 3 shows a process of forming an elastomer solution layer using a nanocomposite solution.
Figure 4:
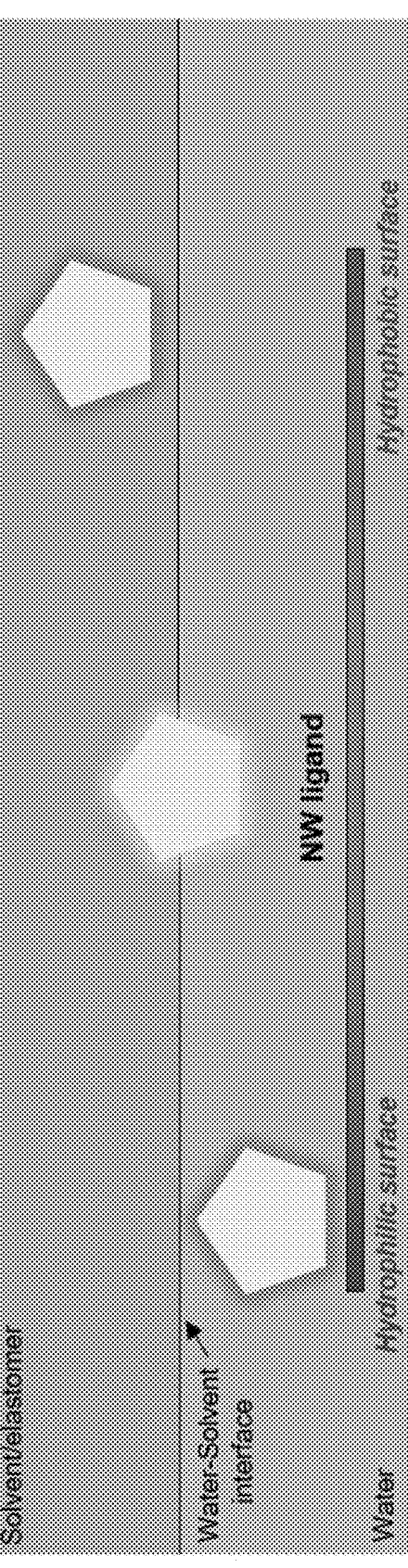
FIG. 4 shows the arrangement position of the nanostructures according to the nature of the amphiphilic ligand of the nanostructures.

The water-miscible ethanol is dissolved in the water, and the elastomer solution containing the water-insoluble elastomer (SEBS) and the water-immiscible solvent (toluene) stays on the water to form the elastomer solution layer. An interface is formed between the water (including ethanol) and the elastomer solution layer. The nanowires with the amphiphilic ligand, polyvinylpyrrolidone (PVP), settle at the interface and stabilize the system by lowering the interfacial energy between water/ethanol and toluene/SEBS (see FIG. 3). When the amphiphilic ligand is more hydrophilic, the nanowires are positioned in water, and when the amphiphilic ligand is more hydrophobic, the nanowires are positioned in toluene (see FIG. 4).

Figure 5:
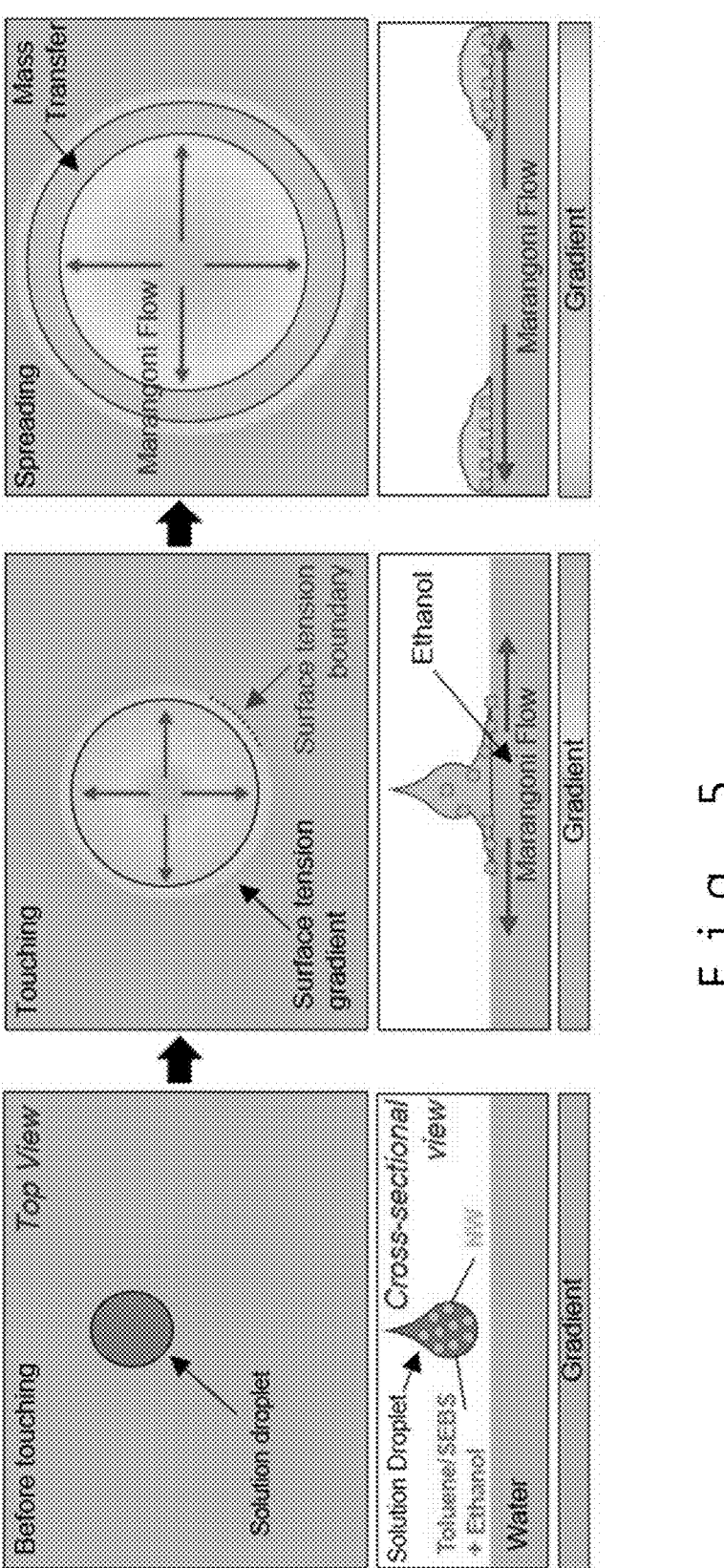
FIGS. 5 and 6 show the movement of the afloat mass by Marangoni flow due to the surface tension gradient formed by the dissolution of ethanol in water.
Figure 6:
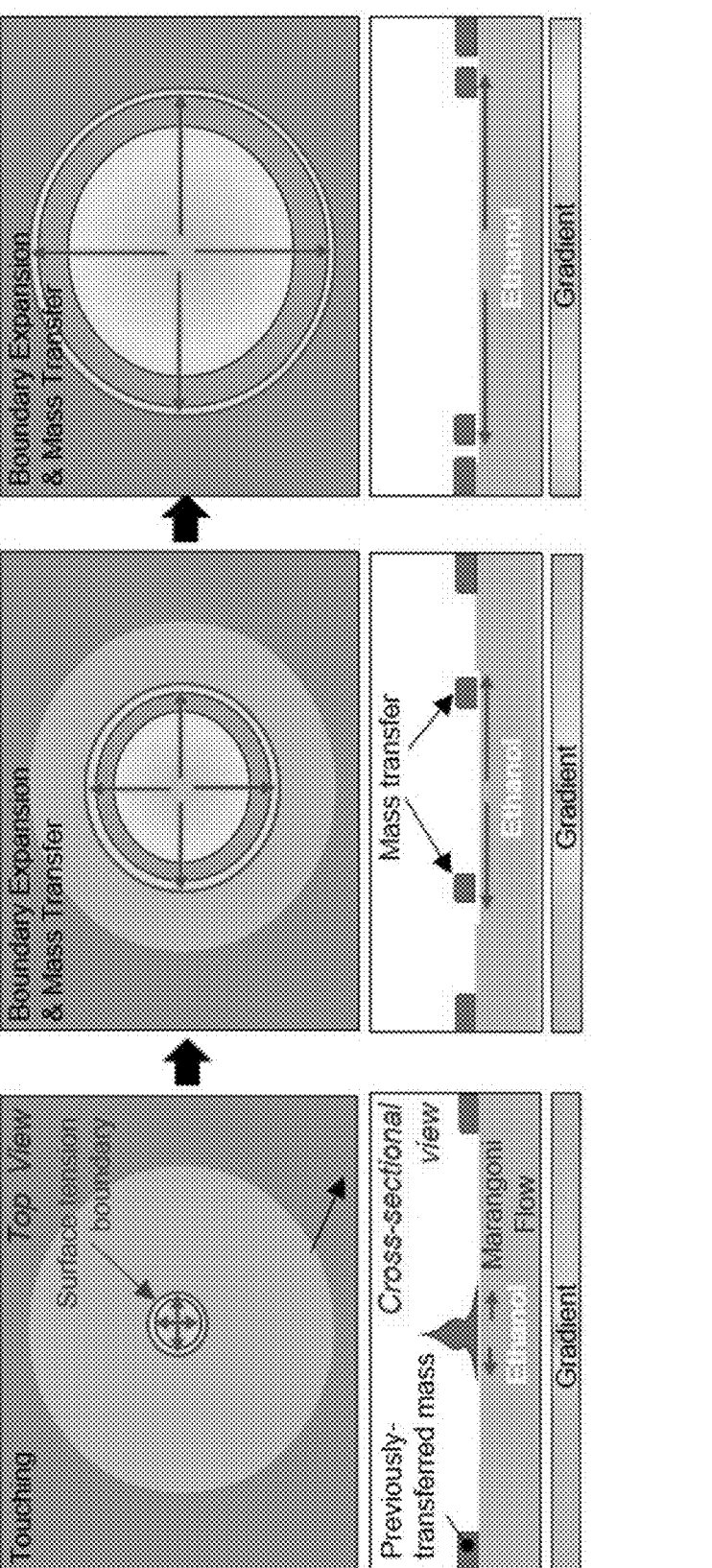
Figure 7:
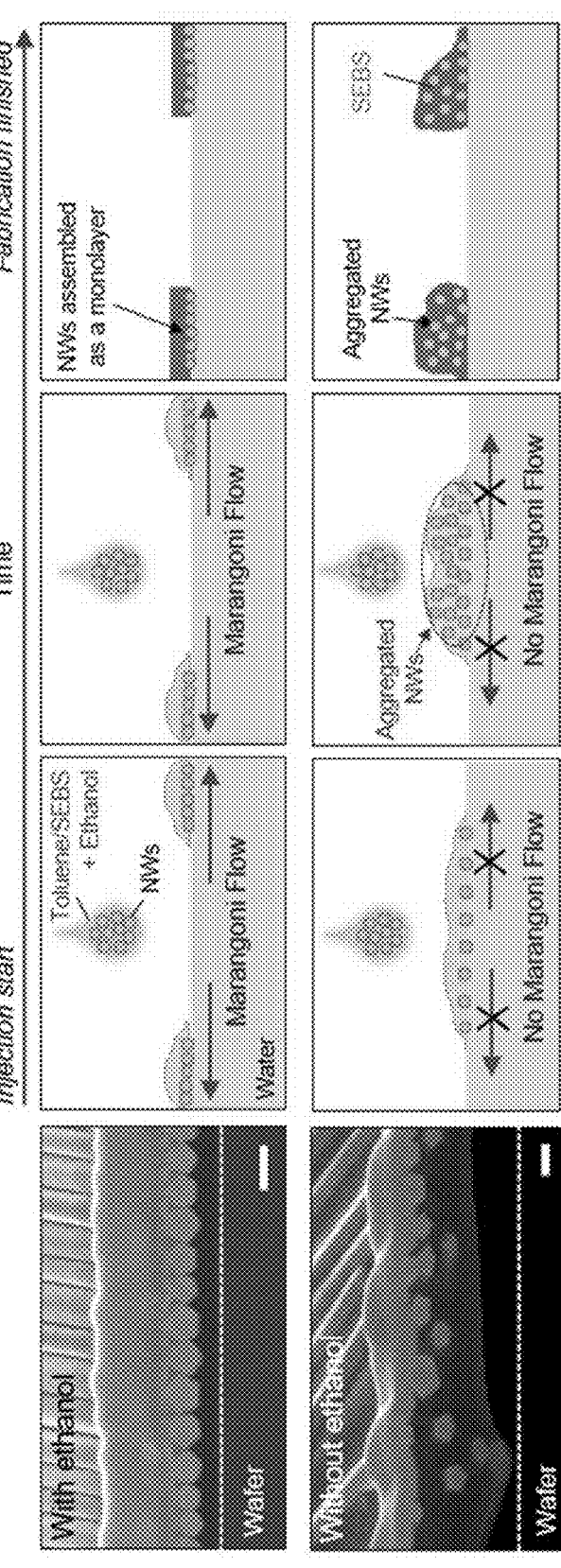
FIG. 7 is a view for explaining the effect of ethanol on the movement of the afloat mass.

When the ethanol is dissolved in the water, the local surface tension decreases, resulting in a circular surface tension gradient near the droplet (see FIG. 5). This gradient induces a Marangoni flow from center to boundary to drag afloat mass containing toluene, SEBS and nanowires. As the ethanol spreads, the boundary expands. The afloat mass thus move until they reach a previously delivered afloat mass and then merge (see FIG. 6). Because the Marangoni flow transports the afloat mass rapidly, the nanowires assemble as a monolayer and agglomeration is inhibited. However, using the same process in the absence of ethanol (i.e., without Marangoni flow) the nanowires agglomerate (see FIG. 7).

As the elastomer solution continues to be provided, the elastomer solution layer (assembled afloat mass) builds up from the edge of the container to the center, eventually covering the entire water surface. At this stage, the nanowires on the water are not completely filled.

3) The elastomer solution layer is packed on the first solvent.

When a few drops of surfactant are dropped on the center of the elastomer solution layer, the elastomer solution layer (afloat mass) is pushed outward. Accordingly, the elastomer solution layer is packed outward, and the nanowires may also be more packed. When a surfactant is used, the nanowires can be uniformly densely packed in the form of a single layer than when a surfactant is not used (see FIG. 8).

4) The elastomer solution layer is dried to form the elastomer layer and form the nanomembrane comprising the elastomer layer and the nanostructures bonded to the elastomer layer.

The toluene of the elastomer solution layer is evaporated immediately (within 5 minutes) at room temperature to form the ultra-thin elastomer layer. The nanowires are partially embedded in the elastomer layer. The nanowires may be packed and disposed as a single layer on the elastomer layer. Thereby, the nanomembrane comprising the elastomer layer and the nanostructures is formed. The nanomembrane have good elasticity and conductivity.

According to the forming method of the nanomembrane, it is possible to form nanomembranes of various sizes by controlling the size of the container, process conditions, etc. In addition, the nanomembrane can have a uniform thickness and structure even if it is formed to be large. The nanomembrane can be transferred to various substrates such as wafers, plastic substrates, and elastomer substrates for further processing.

The nanomembrane can have high loading of nanowires, high stretchability and ultra-thin thickness. In general, when a large amount of nanowires are loaded into an elastomer nanocomposite, high conductivity can be obtained, but due to the high loading of nanowires, the nanocomposite becomes stiff, brittle, and loses its original elasticity. In addition, it is difficult to form an ultra-thin layer on a solid substrate due to the viscosity of the elastomer nanocomposite solution. However, it is possible to form ultrathin nanomembrane with high loading of nanowires (>80 wt %) and high elasticity (high stretchability) on water.

Figure 9:
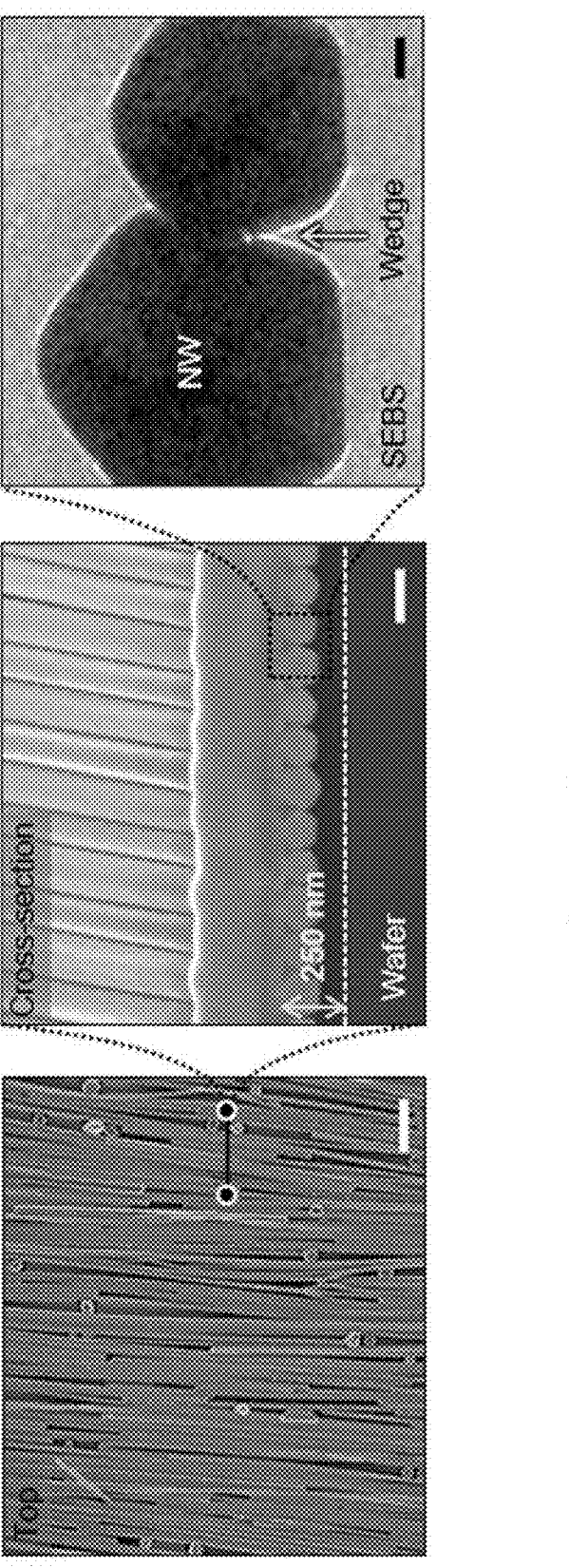
FIG. 9 is a microscope image showing the structure of the nanomembrane.
Figure 10:
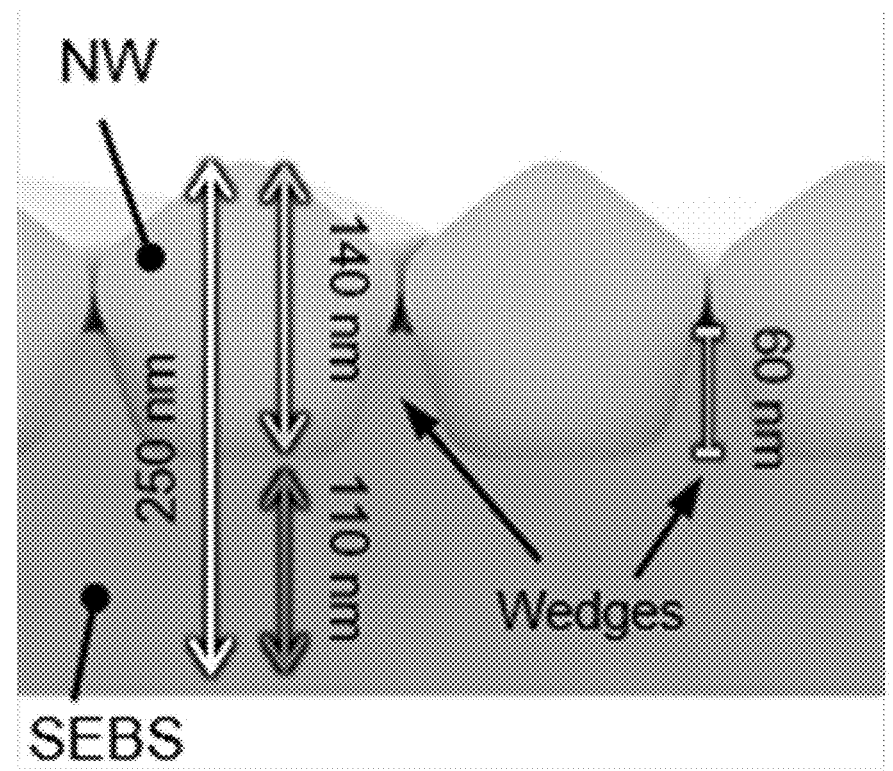
FIG. 10 shows a cross-section of the nanomembrane for explaining the structure and dimensions of the nanomembrane.

FIG. 9 is a microscope image showing the structure of the nanomembrane, and FIG. 10 shows a cross-section of the nanomembrane for explaining the structure and dimensions of the nanomembrane.

Referring to FIGS. 9 and 10, the properties of the nanomembrane are due to the unique cross-sectional structure, which is derived from the monolayer assembly of nanowires at the water-solvent interface. About half of the nanowires are fixed to the elastomer layer, and the cross-sectional structure resembles a tooth embedded in a gum. The bonding structure of the nanowires and the elastomer layer may be stably maintained by the elastomer wedges between nanowires having a height of about 60 nm.

Figure 11:
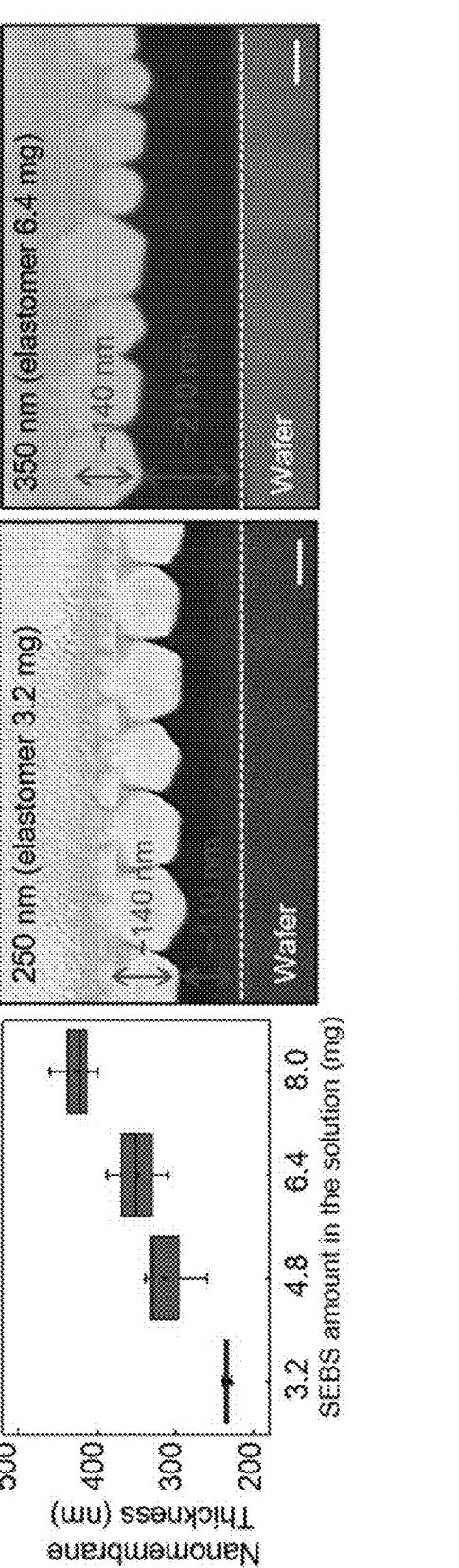
FIG. 11 shows the thickness of the nanomembrane according to the content of the elastomer.

The thickness of the nanomembrane varies depending on the thickness of the elastomer layer, and the thickness of the elastomer layer can be controlled by the amount of the elastomer included in the nanocomposite solution. When the amount of the elastomer is 3.2 mg, the nanomembrane has a thickness of about 250 nm, and is composed of a single nanowire layer with a diameter of about 140 nm and an elastomer layer with a thickness of about 110 nm. In addition, when the amount of elastomer is 6.4 mg, the nanomembrane has a thickness of about 350 nm, and is composed of a single nanowire layer with a diameter of about 140 nm and an elastomer layer with a thickness of about 210 nm (see FIG. 11).

Figure 12:
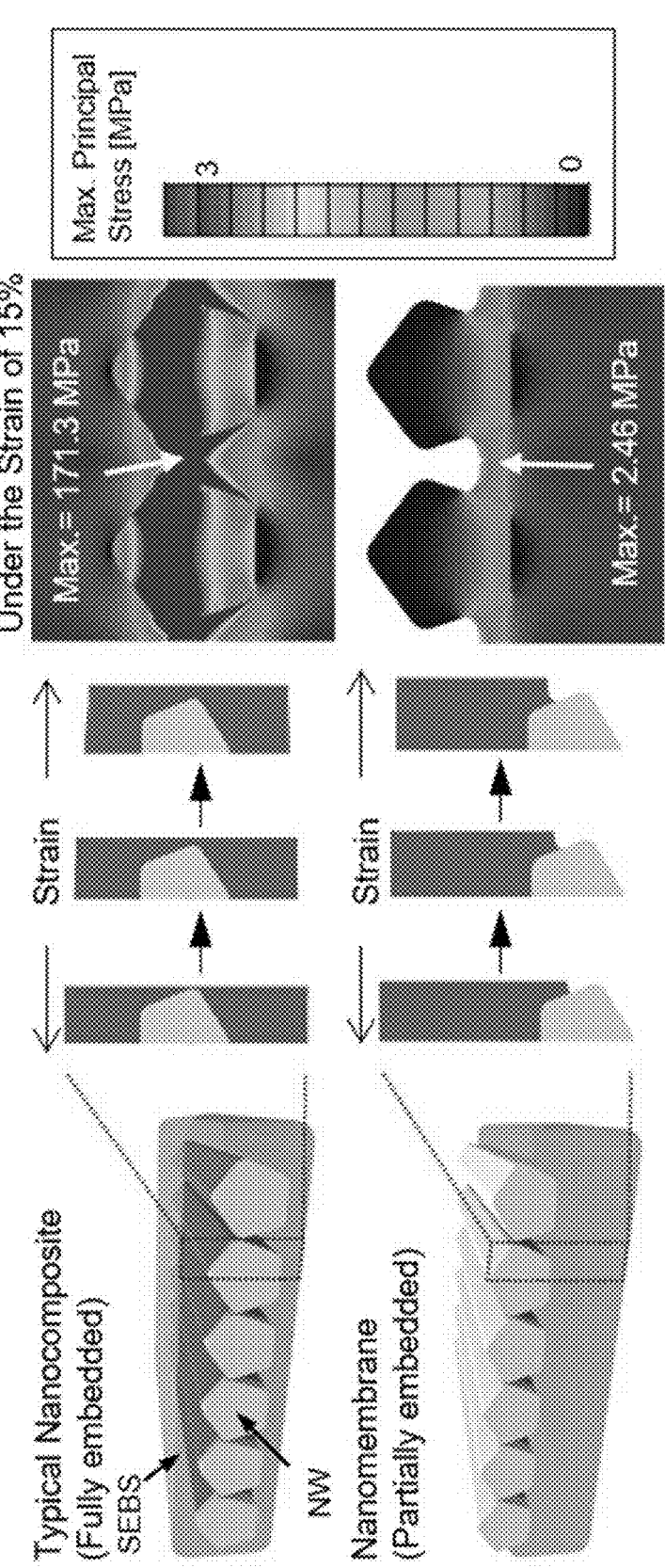
FIG. 12 shows the strain distribution in the case where the nanowires are fully embedded in the elastomer layer and partially embedded in the elastomer layer.

The elastomer layer effectively disperses the induced strain. A typical nanocomposite in which the nanowires are fully embedded inside the elastomer layer shows a high level of stress concentrated at the interface between the nanowire and the elastomer under mechanical strain (see the upper view of FIG. 12). However, the elastomer layer in which the nanowires are partially embedded exhibits much less stress at the interface under the same mechanical strain (see the lower view of FIG. 12). This provides good elasticity even at high weight fractions (>80 wt %) of the nanowires.

Figure 13:
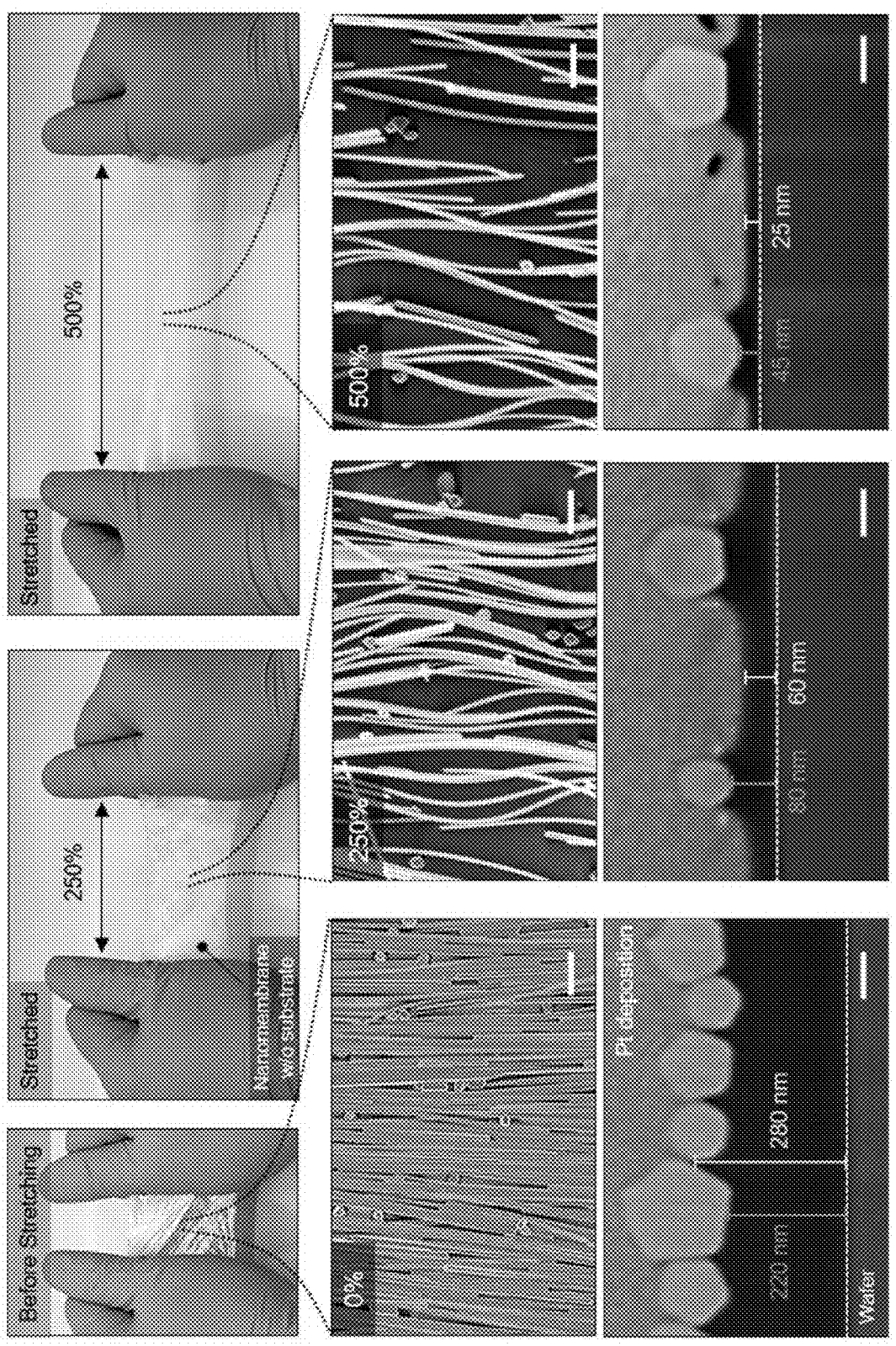
FIG. 13 is a view for explaining the elasticity of the nanomembrane.

FIG. 13 is a view for explaining the elasticity of the nanomembrane.

Referring to FIG. 13, the maximum elongation of the nanomembrane is 540%, which is almost similar to that of the bare elastomer membrane. The applied strain is mainly dissipated by the elastomer layer, in particular the wedge region. Before stretching, the thickness (about 280 nm) of the elastomer between the nanowires is thicker than the thickness (about 220 nm) of the elastomer under the nanowires. However, at strains of 250% and 500%, the thickness of the elastomer between the nanowires becomes about 60 nm and about 25 nm, respectively, and the thickness of the elastomer under the nanowire becomes about 80 nm and about 45 nm, respectively. The applied strain is mostly dissipated by the elastomer between the nanowires (i.e., the wedge region), which minimizes the induced strain at the interface between the nanowires and the elastomer, leading to a large elongation of the nanomembrane.

Figure 14:
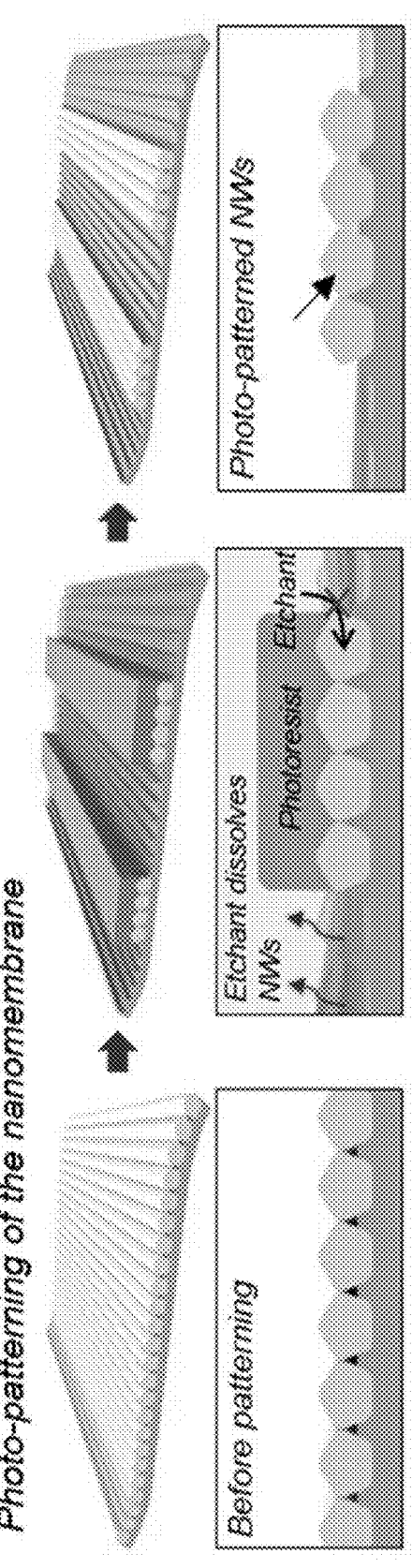
FIG. 14 is a view for explaining patterning of the nanomembrane.
Figure 15:
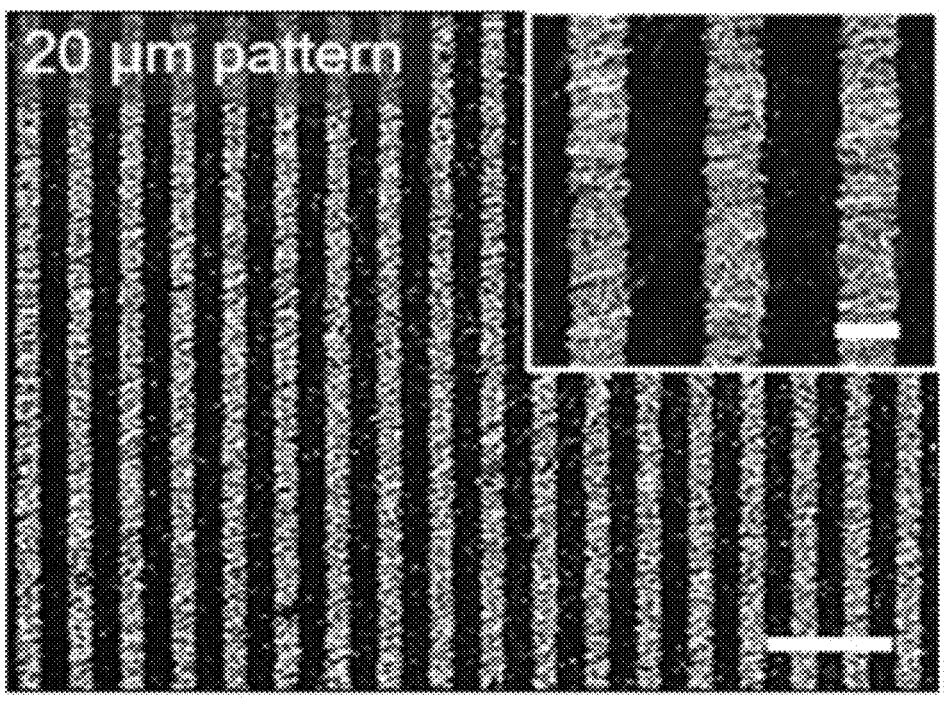
FIG. 15 is a SEM image of the patterned nanomembrane.

FIG. 14 is a view for explaining patterning of the nano-membrane, and FIG. 15 is an SEM image of the patterned nanomembrane.

Referring to FIGS. 14 and 15, high-resolution patterning of nanowires using photolithography is possible. The nanowire pattern to be formed may be protected by the photoresist pattern, and the nanowires not protected by the photoresist pattern may be removed by etching. Because the nanowires are partially exposed in the elastomer, etching is easy, and various nanowire patterns can be formed. The compactly assembled nanowires retain their interconnections even after high-resolution patterning.

Figure 16:
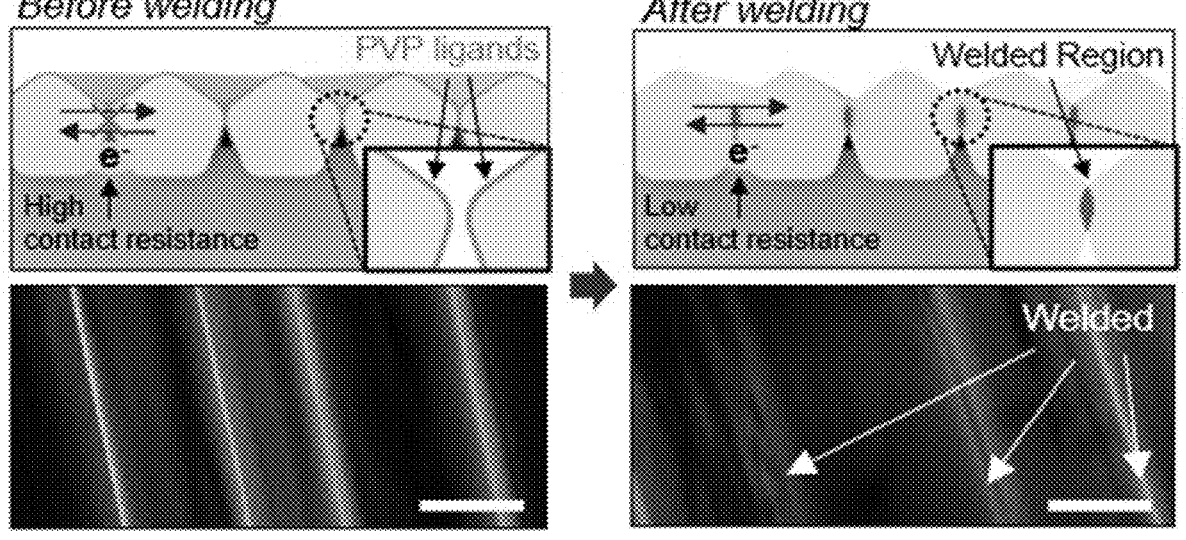
FIG. 16 shows the nanomembrane before and after cold welding.

FIG. 16 shows the nanomembrane before and after cold welding.

Referring to FIG. 16, the contact or connection between the nanowires may be further strengthened by cold welding the partially exposed nanowires. The surfaces of the nanowires are covered with a PVP ligand that causes some separation between the nanowires. Treatment with salty water such as sodium chloride solution can remove PVP from the surfaces of the nanowires. The capillary forces generated during water evaporation then induce cold welding of the nanowires (see FIG. 17). A firm connection can then be made between the nanowires (white arrows).

FIG. 18 shows the change in the conductivity of the nanomembrane before and after cold welding.

Referring to FIG. 18, the conductivity of the nanomembrane is greatly improved after cold welding. The conductivity may vary depending on the measurement direction, and the measurement direction is parallel or perpendicular to the direction of the nanowire, and the conductivity is about 100,000 S/cm.

FIG. 19 shows the conductivity of the nanomembrane under applied strain.

Referring to FIG. 19, the nanomembrane maintains high conductivity up to 200% in the parallel direction and 1000% in the vertical direction. For the stretch test, the nanomembrane was mounted on the elastic substrate because the stretchable electrode is usually mounted on the elastic substrate. If there is no elastic substrate, deformation is not uniformly applied during the stretching test, and the stretch-ability becomes 150% (parallel) and 450% (vertical). The connections between the nanowires formed by cold welding are preserved in the stretched state, and if not cold welded, the nanowires may be separated when stretched.

Figure 20:
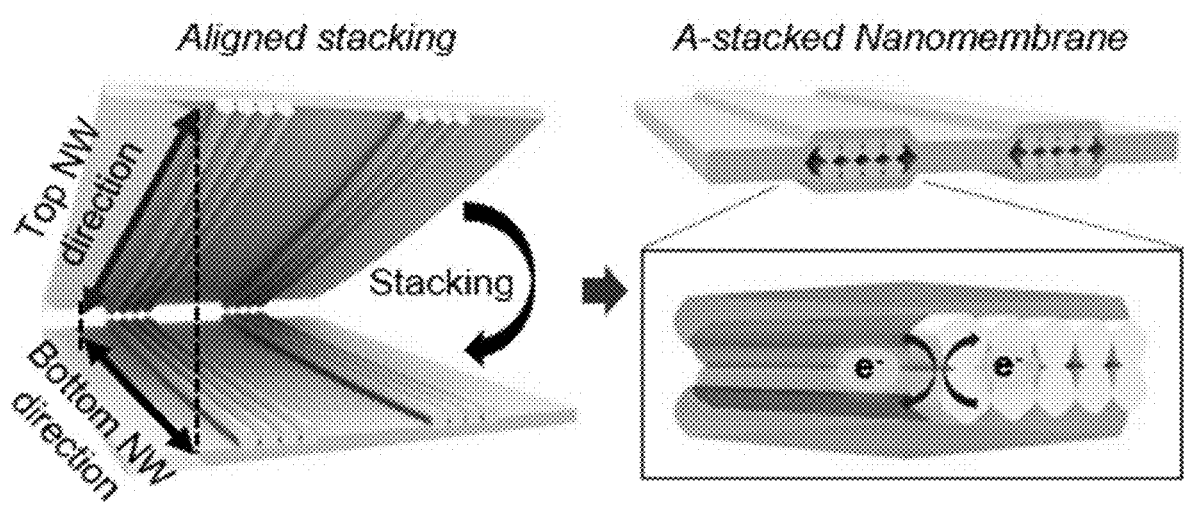
FIG. 20 shows an aligned stacked nanomembrane formed by stacking the two nanomembrane so that the nanowires in the two nanomembrane are aligned and overlapped with each other in the horizontal direction.
Figure 21:
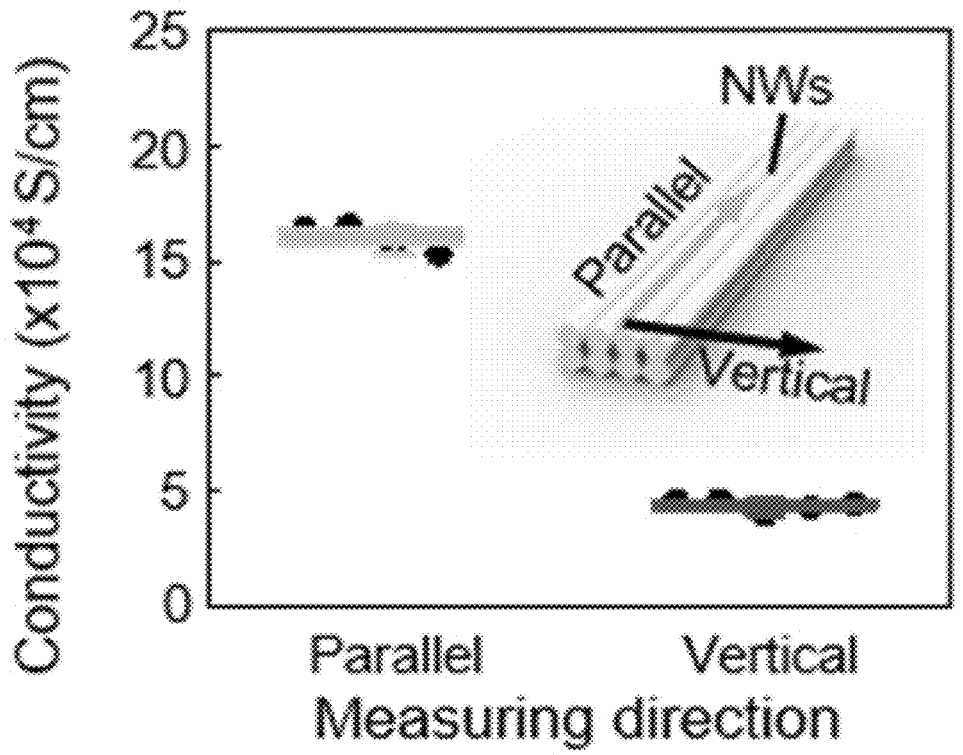
Figure 24:
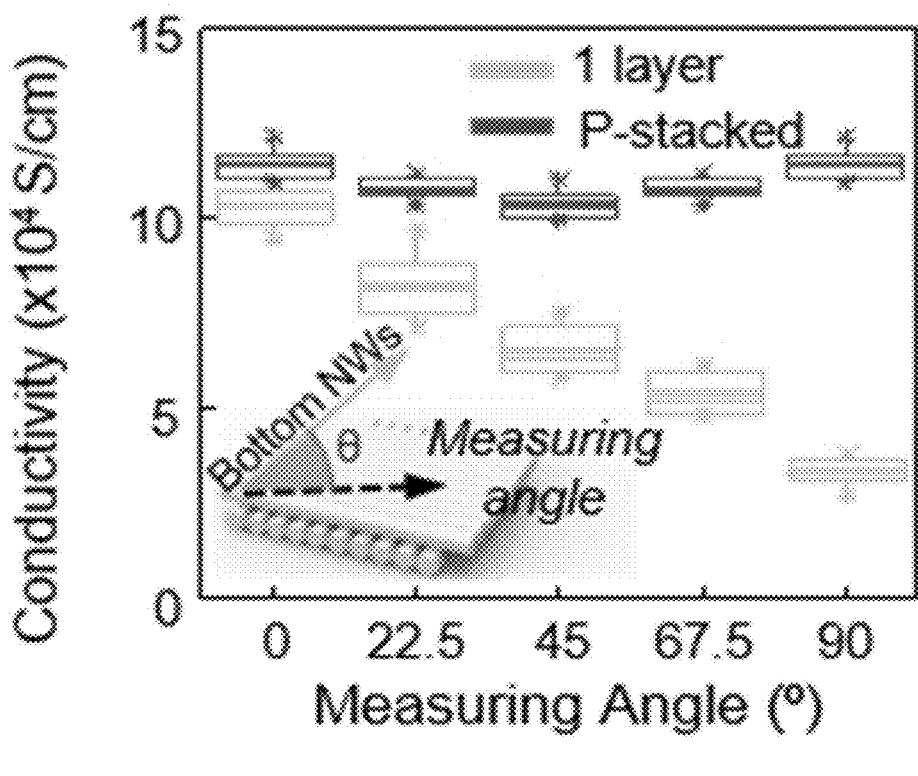
FIGS. 24 and 25 show the conductivity of the perpendicularly-stacked nanomembrane of FIG. 23.
Figure 25:
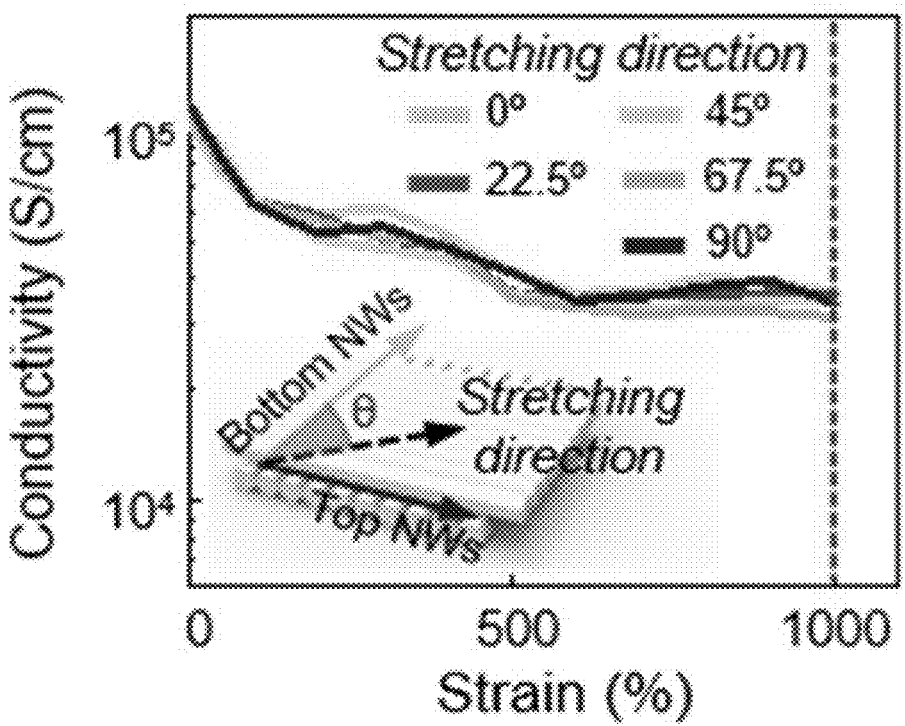

FIG. 20 shows an aligned stacked nanomembrane formed by stacking the two nanomembrane so that the nanowires in the two nanomembrane are aligned and overlapped with each other in the horizontal direction, and FIGS. 21 and 22 show the conductivity of the aligned stacked nanomembrane of FIG. 20. FIG. 23 shows a perpendicularly-stacked nanomembrane formed by stacking the two nanomembrane so that the nanowires in the two nanomembrane intersect and overlap each other in the vertical direction, and FIGS. 24 and 25 show the conductivity of the perpendicularly-stacked nanomembrane of FIG. 23.

Referring to FIGS. 20 to 25, two nanomembrane layers may be stacked to maximize conductivity (aligned stacked nanomembrane) or to improve conductivity asymmetry (per-pendicularly-stacked nanomembrane). The aligned stacked nanomembrane can have a high conductivity of up to 165,700 S/cm, and can maintain conductivity up to 400% strain in the parallel direction and up to 1000% in the vertical direction. The perpendicularly-stacked nanomembrane can have a high conductivity of 100,000 S/cm or more regardless of the measurement direction, and can maintain a relatively high conductivity of about 30,000 S/cm even under 1,000% strain regardless of the stretching direction. Depending on the specific application where high or symmetrical conductivity is required, an appropriate stacked nanomembrane can be selected and used.

Figure 26:
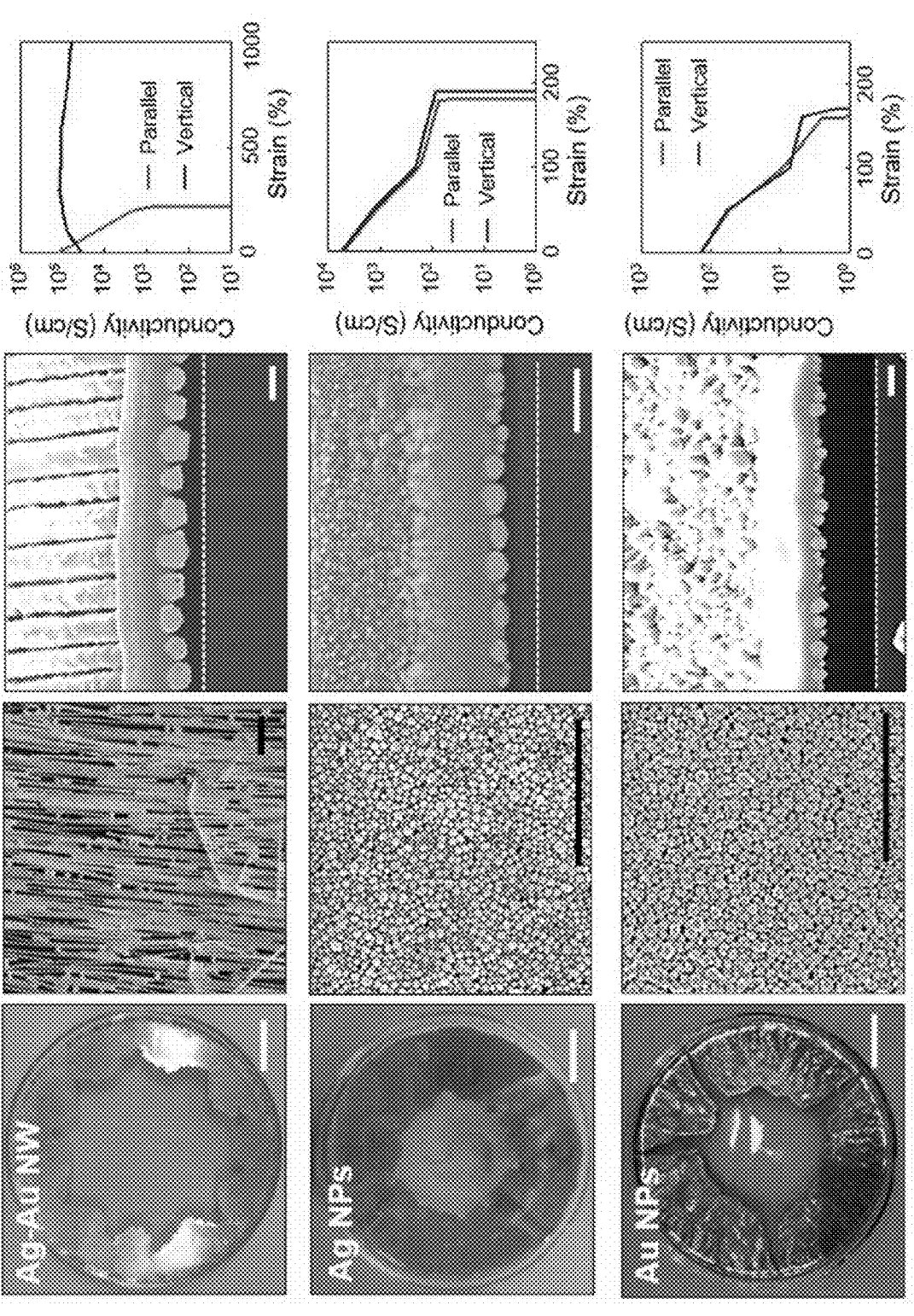
FIG. 26 shows nanomembranes formed using various types of nanostructures.
Figure 27:
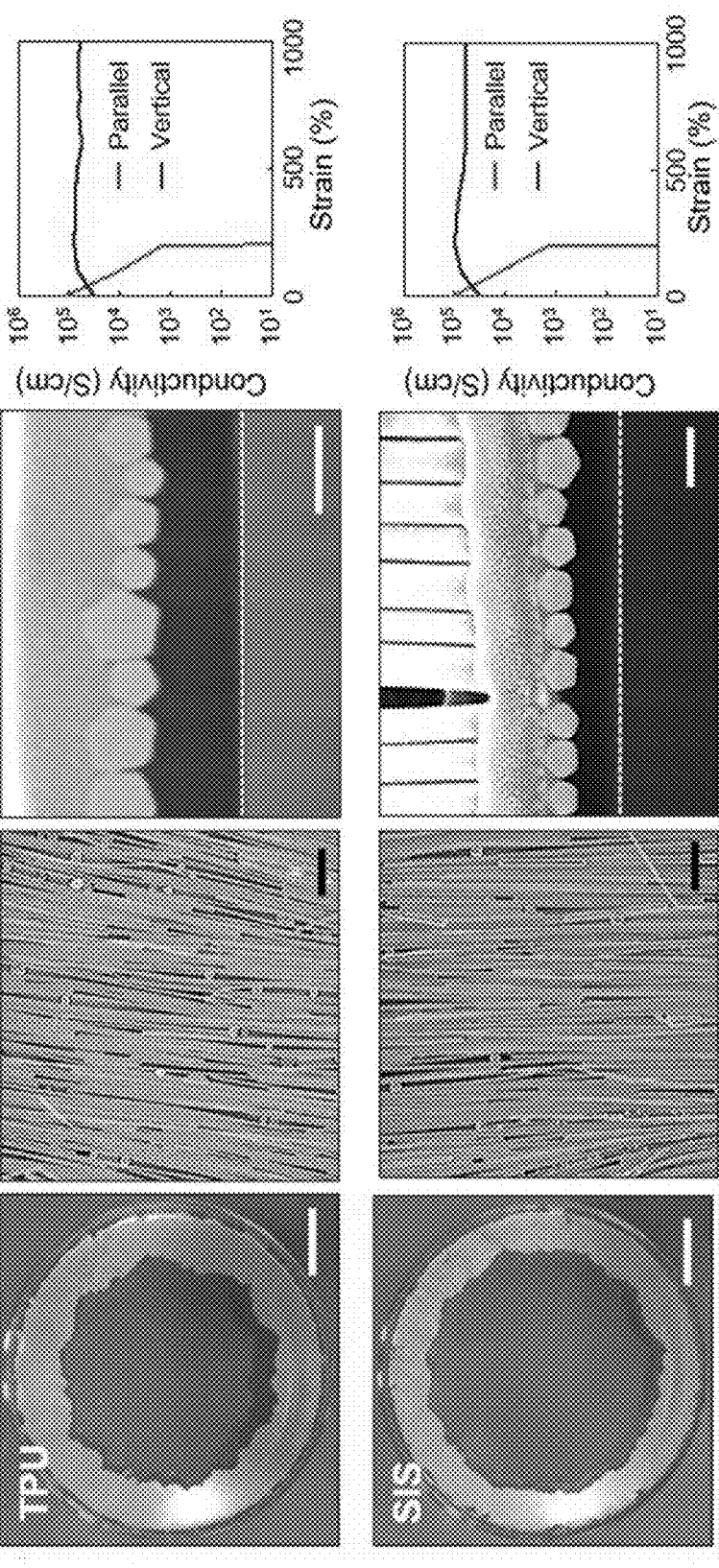
FIG. 27 shows nanomembranes formed using various types of elastomers.

FIG. 26 shows nanomembranes formed using various types of nanostructures, and FIG. 27 shows nanomembranes formed using various types of elastomers.

Referring to FIGS. 26 and 27, nanomembranes can be formed using metal nanostructures such as silver-gold nanowires (Ag—Au NWs), silver nanoparticles (Ag NPs), and gold nanoparticles (Au NPs). The nanomembrane containing silver-gold nanowires exhibit similar properties and performance to the nanomembrane containing silver nanowires. The nanomembranes containing silver nanoparticles or gold nanoparticles have different characteristics from the nanomembrane containing nanowires. Nanomembranes can also be formed using other elastomers such as TPU and SIS. That is, it is possible to select a nanostructure and an elastomer suitable for the application field of the nanomembrane.

FIG. 28 is an exploded view of a sensor array of a multifunctional skin-mounted sensing device including a nanomembrane, and FIG. 29 is an optical camera image showing a sequential stack of each sensor array of FIG. 28.

Referring to FIGS. 28 and 29, the patterned nanomembrane may be applied to a multifunctional skin-mounted sensing device. The sensing device is a multi-layered stretchable device and may comprise four types of sensor arrays. Each sensor array consists of sensors, VIAs and interconnections. Each layer uses a nanomembrane suitable for a specific purpose. The electrophysiological sensor (bottom) uses a nanomembrane comprising biocompatible silver-gold core-sheath nanowires because it is in direct contact with the skin. The temperature sensor and strain sensor (middle) use a nanomembrane comprising silver nanowires and silver nanoparticles, respectively, for sensitive measurements. The humidity sensor (top) uses a nanomembrane comprising gold nanoparticles because of its high resistance to oxidation. Each sensor array is electrically insulated by an insulating layer (SEBS). All layers (sensors, interconnections) are integrated through VIAs. For VIAs and interconnections, perpendicularly-stacked Ag NW nanomembranes are used due to their symmetrical conductivity.

When each layer makes conformal contacts during stacking, the SEBS elastomer in each layer forms strong adhesion between the nanomembranes. Each sensor array is integrated through sequential stacking, and external wires are connected to contact pads.

FIG. 30 shows an optical camera image of a skin-mounted sensing device and electromyography (EMG) data recorded in three channels, and FIGS. 31 and 32 show signal changes of strain, temperature, and humidity measured by a sensor of a sensing device touched with a wet finger.

Referring to FIGS. 30 to 32, the multifunctional sensing device can make a conformal contact to human skin. The sensing device can record electrophysiological signals (e.g., electromyography), temperature changes (e.g., under warm or hot wind), strain changes (e.g., cyclic strains of 10%, 20%, and 30%) and humidity changes (e.g., partially wet or fully wet). Changes in temperature, strain and humidity can be measured by touching the upper left or lower right corner of the sensor array with a wet finger.

As above, the exemplary embodiments of the present invention have been described. Those skilled in the art will appreciate that the present invention may be embodied in other specific ways without changing the technical spirit or essential features thereof. Therefore, the embodiments disclosed herein are not restrictive but are illustrative. The scope of the present invention is given by the claims, rather than the specification, and also contains all modifications within the meaning and range equivalent to the claims.

What is claimed is:

1. A nanomembrane comprising:

an elastomer layer; and nanostructures disposed on the elastomer layer, wherein the nanostructures comprise a plurality of nanowires, wherein the nanowires include first portions and second portions, the first portions being embedded in the elastomer layer and the second portions being exposed on the surface of the elastomer layer, the second portions being configured to conduct electricity, and wherein the nanowires are assembled on the elastomer layer in a non-overlapping monolayer configuration.

2. The nanomembrane of claim 1, wherein the nanostructures are connected to each other.

3. The nanomembrane of claim 1, wherein the nanostructures have conductivity.

4. The nanomembrane of claim 1, wherein the nanowires have a diameter of about 140 nanometers.

5. The nanomembrane of claim 1, wherein nanowires are aligned and packed through interfacial self-assembly at a liquid interface.

6. The nanomembrane of claim 1, wherein the elastomer layer is formed by solvent evaporation at room temperature following formation of a nanocomposite solution deposited on water.

7. The nanomembrane of claim 1, wherein the nanowires are assembled at the interface between a water-miscible solvent and a water-immiscible solvent.

8. The nanomembrane of claim 1, wherein the nanomembrane has a nanoscale thickness of about 350 nm.

9. The nanomembrane of claim 1, wherein the nanomembrane has a thickness of about 220 to about 420 nm.

10. The nanomembrane of claim 1, wherein the nanomembrane has a thickness of about 250 nm to about 350 nm.

11. A nanomembrane comprising:

a first elastomer layer;

first nanostructures disposed on the first elastomer layer;

second nanostructures disposed on the first nanostructures; and a second elastomer layer disposed on the second nanostructures, wherein the first nanostructures comprise at least one of nanowires and nanoparticles, wherein the first nanostructures are partially embedded in the first elastomer layer, wherein the first nanostructures are disposed as a single layer on the elastomer layer, and wherein the nanomembrane has a nanoscale thickness.

12. The nanomembrane of claim 11, wherein the single layer is a monolayer.

* * * * *